United States Patent [19]

Kremen

[11] 4,198,123

[45] Apr. 15, 1980

[54] OPTICAL SCRAMBLER FOR DEPOLARIZING LIGHT

[75] Inventor: Jerome C. Kremen, Takoma Park, Md.

[73] Assignee: Baxter Travenol Laboratories, Inc., Deerfield, Ill.

[21] Appl. No.: 780,386

[22] Filed: Mar. 23, 1977

[51] Int. Cl.² ............................................. G02B 1/24
[52] U.S. Cl. .................................... 350/157; 356/317
[58] Field of Search ....................... 356/85, 317, 318; 350/157

[56] References Cited

U.S. PATENT DOCUMENTS

| | | | |
|---|---|---|---|
| 2,471,248 | 5/1949 | Stearns et al. | 356/322 |
| 2,976,764 | 3/1961 | Hyde et al. | 356/367 |
| 3,345,905 | 10/1967 | Acloque | 356/367 |
| 3,399,591 | 9/1968 | Drougard et al. | 356/351 |
| 3,689,163 | 9/1972 | Glorioso | 356/400 |
| 3,692,385 | 9/1972 | Gievers | 350/157 |
| 3,737,235 | 6/1973 | Hawes | 356/351 |
| 3,744,876 | 7/1973 | Kay et al. | 350/157 |
| 3,807,837 | 4/1974 | Schmidt et al. | 350/157 |

FOREIGN PATENT DOCUMENTS 2443950  3/1975  Fed. Rep. of Germany ............. 356/85

OTHER PUBLICATIONS

"Effectiveness of a Quartz Rod as a Light Depolarizer," Portigal, Applied Optics, vol. 8, #4, Apr. 1969, pp. 838–839.
"A Polarizer for the Vacuum Ultraviolet," Steinmetz et al., Applied Optics, vol. 6, #6, Jun. 1967, pp. 1001–1004.

*Primary Examiner*—Vincent P. McGraw
*Attorney, Agent, or Firm*—Henry W. Collins; Paul C. Flattery; Eugene Cummings

[57] ABSTRACT

An optical scrambler for depolarizing a beam of polarized incident light comprises two birefringent prisms having orthometric optic axis. The prisms are juxtaposed with their inclined surfaces joined in optically wrung relationship to receive the incident light with the axis of polarization thereof aligned at 45 degrees with respect to the optic axis of the prisms.

6 Claims, 12 Drawing Figures

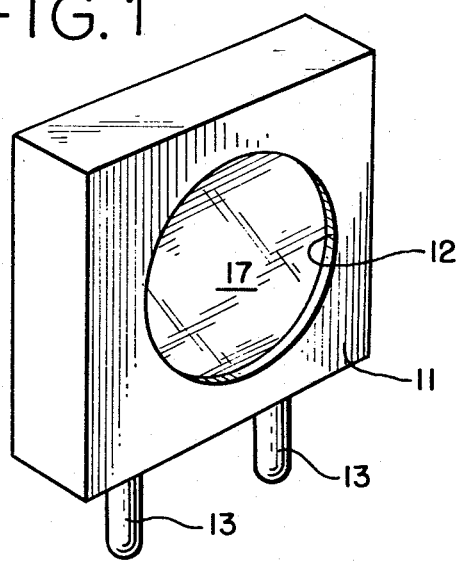
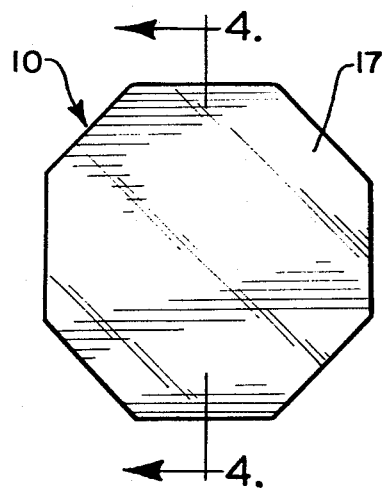
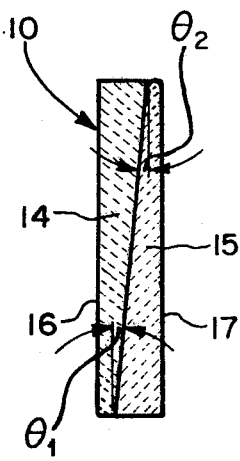
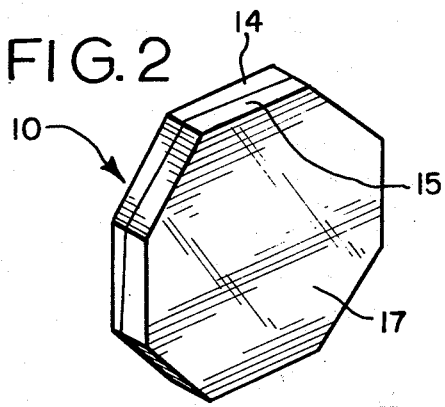
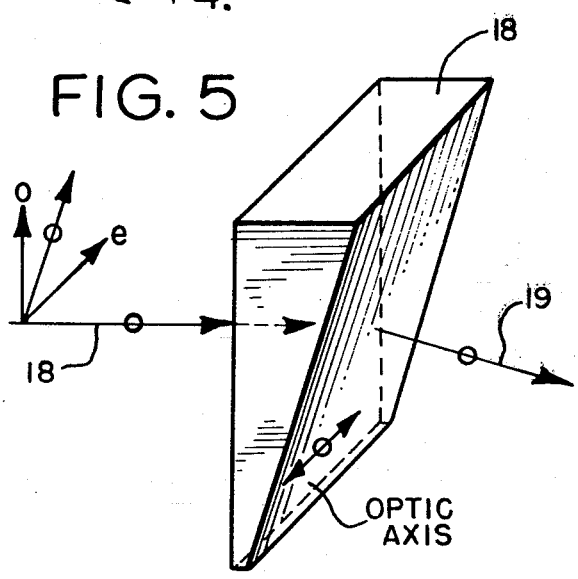
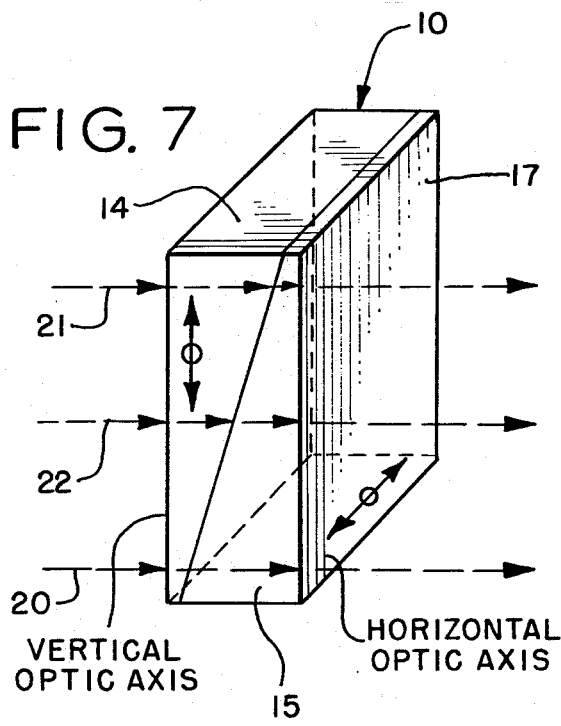
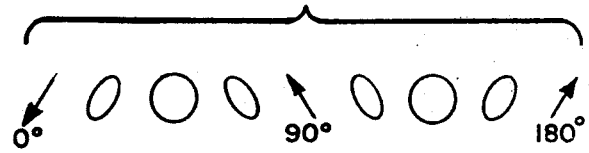

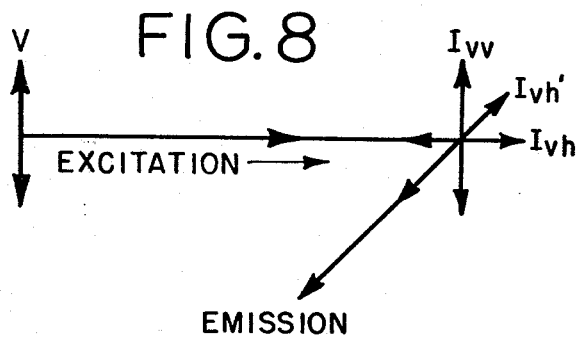
FIG. 8
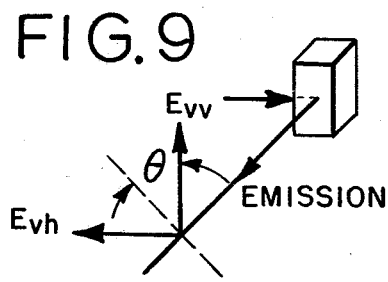
FIG. 9
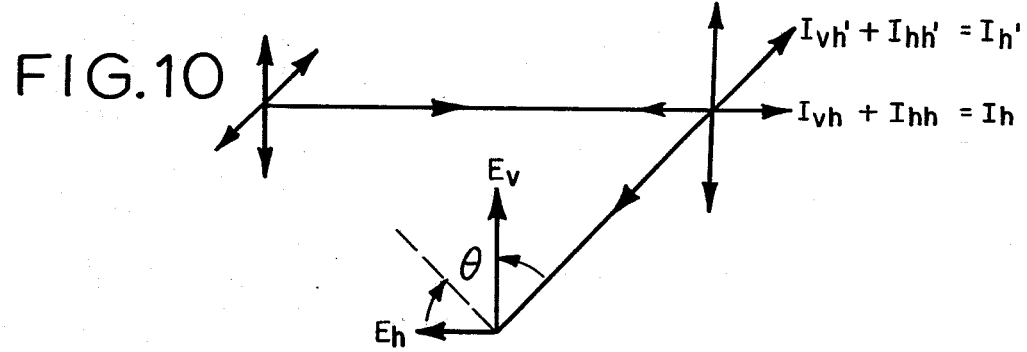
FIG. 10
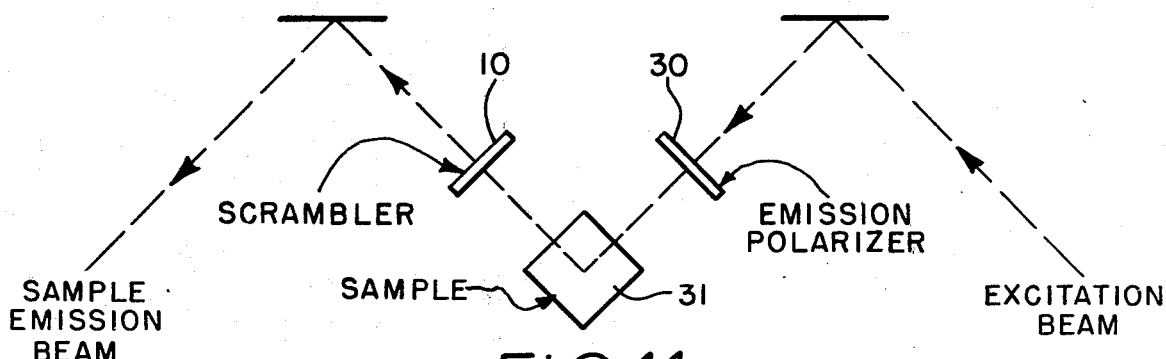
FIG. 11
FIG. 12

OPTICAL SCRAMBLER FOR DEPOLARIZING LIGHT

BACKGROUND OF THE INVENTION

The present invention is directed generally to optical devices, and more particularly to devices for altering the polarization of a beam of light.

In certain types of photometric apparatus, particularly those which employ monochromating devices, such as spectrophotometers and spectrofluorometers, varying degrees of polarization take place in the light beam relied upon for measurement. This polarization is undesirable and performs no useful function, and may result in erroneous readings from the apparatus.

Thus, the need has existed in such apparatus for an optical device which can be interposed in the light beam to scramble or in effect "depolarize" the light beam. Preferably, such optical scramblers should be compact and efficient, and relatively independent of the wavelength of the incident light. The present invention is directed to such a device.

Accordingly, it is a general object of the present invention to provide a new and improved optical scrambler.

It is another object of the present invention to provide an optical scrambler which is compact and efficient and suitable for use in conjunction with spectrophotometers and other precision optical measuring apparatus.

SUMMARY OF THE INVENTION

An optical scrambler for depolarizing a beam of incident light comprises a first wedge-shaped bi-refringent prism having a principal face perpendicular to the beam and an inclined face, and a second wedge-shaped prism having a principal face perpendicular to the beam and an inclined face, and an optic axis orthometrically disposed with respect to the optic axis of the first prism. The two prisms are juxtaposed with their base and apex portions oppositely oriented and with their inclined faces in optically wrung relationship.

BRIEF DESCRIPTION OF THE DRAWINGS

The features of the present invention, which are believed to be novel, are set forth with particularity in the appended claims. The invention, together with the further objects and advantages thereof, may best be understood by reference to the following description taken in connection with the accompanying drawings, in the several figures of which like reference numerals identify like elements and in which:

FIG. 1 is a perspective view of an optical scrambler constructed in accordance with the invention in a holder for installation in optical measuring apparatus.

FIG. 2 is a perspective view of the optical scrambler removed from its holder.

FIG. 3 is a front elevational view of the optical scrambler.

FIG. 4 is a cross-sectional view of the optical scrambler taken along line 4—4 of FIG. 3.

FIG. 5 is a diagrammatic view of a single-wedge prism and impinging light ray useful in explaining the operation of the invention.

FIG. 6 is an illustration useful in explaining the progressive states of polarization of a light beam as it progresses through the optical scrambler of the invention.

FIG. 7 is a diagrammatic perspective view of the optical scrambler of the invention showing impinging light rays useful in explaining the operation of the invention.

FIG. 8 is a diagrammatic view useful in explaining the effects of a vertically polarized excitation beam of light upon a sample and the resulting emission therefrom.

FIG. 9 is a diagrammatic view related to FIG. 8 but with polarization of the resulting emission from the sample occurring at an angle to the vertical.

FIG. 10 is a diagrammatic view related to FIGS. 8 and 9 but with an unpolarized excitation beam, as occurs when using the optical scrambler, and the resulting emission from the sample.

FIG. 11 is a diagrammatic view of a spectrofluorometer illustrating the problem in determining corrected spectra of fluorescent materials whose emission is polarized.

FIG. 12 is a diagrammatic view of a spectrofluorometer illustrating a solution to the problem of FIG. 8 in the case where the excitation beam is vertically polarized.

DESCRIPTION OF THE PREFERRED EMBODIMENT

Referring to FIGS. 1-4, there is shown an optical scrambler 10 constructed in accordance with the invention. To facilitate mounting within a spectrophotometer or spectrofluorometer or other utilization apparatus, the scrambler is contained within a generally rectangular housing 11 having an aperture 12 on either side thereof through which an impinging light beam can pass. The housing may include a pair of alignment pins 13 adapted to fit within corresponding recesses (not shown) in the utilization apparatus to secure the optical scrambler in position.

As best seen in FIGS. 2-4, the optical scrambler consists of two doubly refracting or birefringent wedge-shaped prisms 14 and 15 juxtaposed thick side to thin side with their respective inclined edges facing each other. Both prisms are preferably formed of an anisotropic quartz material in an octagonal shape to facilitate accurate alignment within housing 11. An optically "wrung" interface is obtained between the inclined surfaces of prisms 14 and 15 by lapping the surfaces flat and then bonding the surfaces together. The acute angles $\theta_1$ and $\theta_2$ (FIG. 4) of the two birefringent wedges 14 and 15 are equal so that the two major parallel surfaces 16 and 17 of the optical scrambler are parallel and perpendicular to an incident beam of light. As seen in FIG. 7, the optic axis of wedges 14 and 15 are orthogonal, or perpendicular, the optic axis of wedge 14 being vertical, and the optic axis of wedge 15 being horizontal.

The operation of optical scramber 10 can best be understood by first referring to FIG. 5, wherein the effect of a single birefringent quartz crystal wedge on an incident polarized light ray 18 is illustrated. Linearally polarized light having an electric or e vector at 45 degrees to the optic axis of the quartz crystal is separated into two orthogonal components; one parallel to the optic axis—the extra-ordinary or "e" component, and one perpendicular—the ordinary or "o" component. Because of the birefringent characteristic of the crystal, these components travel with different velocities through the crystal and emerge from the crystal with a difference in phase that depends upon the thickness of the quartz and can be expressed as $$\frac{2\pi T(\eta_o - \eta_e)}{\lambda}$$

where $\lambda$ is the wave length of the incident light, T is the thickness of the quartz wedge, which is variable and depends on the height of the ray above the apex, and $\eta_o$ and $\eta_e$ are the reduction in speed of the o and e components in the quartz crystal compared to the speed of light in air. At the apex, the thickness T is 0 so that the emergent o and e components are in phase and the resultant polarization of the emergent ray 19 is linear and in the same direction as the incident ray.

At a slight distance above the apex, the phase difference is small and the resultant electric vector describes an ellipse as a function of time, and the polarization is elliptical with large eccentricity and a major axis at 45 degrees. The eccentricity decreases as the thickness increases and when the phase difference is $\pi/2$, the emergent light is circularly polarized. At a phase difference of $\pi$, linearly polarized light at right angles to the incident polarization exits the crystal.

The states of polarization of the emergent ray 19 for various thicknesses are illustrated in FIG. 6. From this it can be concluded that if the change in thickness from top to bottom of the wedge is large enough, there will be a number of bands of light or complete polarization cycles at the exit side of the crystal, each consisting of all states of polarization.

The optical scrambler of the invention, which is illustrated diagrammatically in FIG. 7, is based on the same principle as the single quartz wedge but has the advantage of providing twice as many cycles of polarization for a given thickness and an exit beam which is more nearly parallel to the entrance beam. Each of the prisms 14 and 15 introduces a phase shift between the e and o components of an incident light beam by retarding one component with respect to the other component. However, because phase shift of the second wedge 14 is in an opposite direction to that of the first wedge 15, the e and o components of a ray 20 (FIG. 6) incident near the bottom of the scrambler are phase-shifted the same amount as a ray 21 incident near the top of the scrambler, but in an opposite direction. This doubles the number of bands or cycles produced by the scrambler across its output surface 17 which contain all states of polarization. A third beam of light 22 incident at the center of the wedge is first retarded and then advanced for a net variation in phase of zero.

Generally, the greater the number of bands of polarization produced by the scrambler, the more completely polarization errors are eliminated from photometric apparatus with which the scrambler is utilized. In the case of apparatus employing monochromators for wavelength selection a different transmittance exists for each portion of each band. As a wavelength is scanned the bands move across the aperture of the system so that alternately there is one more, and then one less bright band, and the transmitted intensity varies cyclically. When there are more bands the intensity variation is smaller, and thus the accuracy of such apparatus is increased.

The number of phase shift cycles introduced by a quartz prism can be made larger by increasing the prism angle. However, an increased prism angle causes larger deviations in beam direction. In the present invention this is remedied by the use of two prisms, the second prism overcoming to a large extent the deviation of the first prism. The second prism also overcomes to a large extent dispersion introduced by the first prism, thus rendering the resulting compound-prism scrambler substantially achromatic.

The optical scrambler of the invention utilizes prism elements similar to those utilized in the Babinet compensator, which is utilized in the analysis of polarized light to produce a phase difference of any arbitrary amount between two linearly polarized waves in mutually perpendicular planes. The main difference is that the prisms of the Babinet compensator, which are also arranged back-to-back and have orthogonal optical axes, are movable with respect to each other, whereas the inclined surfaces of prisms 14 and 15 in the optical scrambler of the invention are permanently wrung together.

In using the optical scrambler of the invention light is caused to impinge on surface 16 with an axis of polarization at 45 degrees to the axes of the prisms. Thus arranged, an observer looking at the rear surface 17 of the scrambler through a polarization analyzer having an axis of polarization set at 45 degrees to the prism axes, would see an interference pattern composed of a series of parallel equi-spaced bands.

Since the optic axis of one prism is lengthwise and the optic axis of the other prism is transverse, an incident light ray travels through the first prism as an ordinary wave, and through the second prism as an extra-ordinary wave, or vice-versa. If $t_1$ and $t_2$ are the thicknesses of the prisms at any point, the phase difference produced by the first prism is $$\frac{2\pi t_1}{\lambda}(\eta_e - \eta_o)$$

and that produced by the second is $$-\frac{2\pi t_2}{\lambda}(\eta_e - \eta_o).$$

The resultant phase difference is the sum of these, or $$\frac{2\pi}{\lambda}(t_1 - t_2)(\eta_e - \eta_o).$$

The optical scrambler of the invention can also be compared to a Wollaston prism, which is commonly used to convert unpolarized light to two polarized beams deviated through a large angle for separation. The Wollaston prism consists of two prisms of calcite or a like material having a large birefringence so as to cause the o and e components to deviate through a large angle and produce two separate polarized beams.

In contrast to the small apex angle required in the optical scrambler of the invention to obtain a large number of phase cycles, the apex angle of a Wollaston prism is large to facilitate separation of the polarized beams. Furthermore, the prisms in the Wollaston prism are cemented together and therefore will not pass ultraviolet light, whereas the wedges in the scrambler of the invention are optically wrung and will transmit light without limit. While the Wollaston prism does not require orientation with respect to an input beam, the scrambler of the invention does require orientation so that its optic axes will be at 45 degrees to the direction of polarization of the incident beam.

One field where the polarization selectivity of monochromators has been a problem is in the field of spectrofluorometry. For example, when the percent polarization of a sample must be measured, a polarizer is placed in front of the entrance slit of the emission monochromator. The emission monochromator must then transmit, during the course of the measurement, first horizontally polarized light and then vertically polarized light. It is well known that the efficiency of the gratings used in monochromators is different for these two states of polarization, and that the amount of this difference depends on wavelength. As a result, the measured horizontal and vertical intensities of transmitted light are in error and it has been necessary to determine a grating correction factor (G factor) at each wavelength using samples which are known to emit completely unpolarized light. The use of the optical scrambler of the invention makes the procedure unnecessary.

Also important in the use of scramblers in spectrofluorometry for the recording of the corrected spectra of samples which do not emit completely depolarized light, such as large molecules having relaxation times much longer than their fluorescent lifetimes, or molecules in a solid or viscous medium. Present corrected spectrofluorometers do not give true corrected spectra when used with samples of this type.

There is also an error in recording corrected fluorescent spectra of samples which have a degree of polarization ($P \neq 0$) at right angles to the plane of observation. This can be seen in FIG. 8, which represents a vertically polarized beam of light falling on a sample which has a slow rotational relaxation time. The molecules do not reorient themselves in a completely random fashion and as a result, the component Ivv of the emitted fluorescence is larger than Ivh and Ivh'. Also the probability of the dipole moment being in the plane of Ivv and Ivh is the same as the probability of it being in the Ivv–Ivh' plane, so that Ivh = Ivh'. The component of emission, Ivh', is not observed since it lies in the direction of propagation.

Since Ivh' is not propagated, twice as much vertically polarized light is observed as horizontally polarized light. Since the polarization, P, is wavelength dependent in a different fashion than the emission, the emission spectrum observed at 90 degrees will be distorted. If a polarizer is oriented so that twice as much Ivh is passed as Ivv, the unobserved Ivh component is compensated for.

Referring to FIG. 9, assuming observation along the direction of emission, and that the observed intensity, $I_o$, is to be proportional to the three components of FIG. 8, the angle $\theta$ of the polarizer axis can be calculated as follows:

$$Io = K(Ivv + Ivh + Ivh')$$

or, $$Io = K(Ivv + 2Ivh)$$

or, $$Io = (E^2vv \cos^2 \theta + E^2vh \sin^2 \theta)$$

(assuming there is a random phase relation between Evh and Evv) then, $$E^2vv \cos^2 \theta = KIvv = KE^2vv$$

$$E^2vh \sin^2 \theta = 2KIvh = 2KE^2vh$$

$$\tan^2 \theta = 2, \theta = \tan^{-1}\sqrt{2} = 54.73°$$

which is the angle to which the emission polarizer would be set if the excitation polarizer were vertical. Except for instrumental effects such as the spectral transmittance change of the polarizer and the polarization selectivity of the optics, a corrected excitation spectrum could now be obtained by scanning the excitation monochromator.

To eliminate instrumental effects the optical scrambler of the invention could be used instead of a vertically oriented excitation polarizer, since the scrambler would produce equal amounts of horizontally and vertically polarized light at the sample. FIG. 10 shows the components which result with use of the scrambler and emission observed at right angles to the path of the incident light. By reason of symmetry, Ivv = Ihh' and Ihv = Ivh', and as a result Iv = Ih'. Again, if the observed fluorescence Io is to be proportional to the total emission, $$Io = K(Iv + Ih' + Ih)$$

$$Io = K(2Iv + Ih) = K(2E^2v + E^2v)$$

$$Io = E^2v \cos^2 \theta + E^2h \sin^2 \theta$$

or, $$\cos^2 \theta = 2K$$

$$\sin^2 \theta = K$$

$$\tan \theta = \sqrt{\tfrac{1}{2}}$$

$$\theta = 35.26°$$

Thus, for unpolarized excitation the desired angle of the emission polarizer is 35.26°, and to obtain a corrected excitation spectrum, free of the spectral dependence of sample polarization, the emission is set at a fixed wavelength, the emission polarizer is set at 35.3° to the vertical, a scrambler is placed on the excitation side of the sample, and the excitation monochromator is scanned.

The sample has symmetry with respect to the state of polarization on the excitation and emission sides. Thus, a corrected emission spectrum is obtained in the same way except the scrambler is placed on the emission side of the sample and the polarizer, oriented to the calculated angle, is placed on the excitation side.

Thus, in measuring corrected emission spectra of a fluorescent sample in spectrofluorometer apparatus of conventional design and construction, as schematically depicted in FIG. 11, the optical scrambler 10 is positioned on the emission side of the sample 31 and the emission polarizer is positioned on the excitation side of the sample as shown and set at an angle of 35.3 degrees. The photometer controls are now set to produce corrected emission spectra and the emission monochromator is scanned to produce corrected emission spectra compensated for the wavelength dependence of the polarization of the sample. This setup produces the same spectrum that would be obtained by using unpolarized excitation and an integrating sphere to measure emission.

In measuring corrected excitation spectra in a conventional spectrofluorometer, the optical scrambler 10 is placed on the excitation side of the sample 31 and the emission polarizer 30 is placed on the emission side of the sample and set at an angle of 35.3°, as shown in FIG. 12. The photometer controls are now set to produce corrected excitation spectra and the excitation monochromator is scanned to produce corrected excitation spectra compensated for the wavelength dependence of the polarization of the sample.

It will be appreciated that only a portion of the spectrofluorometer apparatus is shown in FIGS. 11 and 12, and that the balance of this apparatus, including the excitation and emission monochromators, may be entirely conventional in design and construction.

In one form the optical scrambler of the invention is marketed as the J4-8928A Polarization Accessory of the American Instrument Company for use in their model SPF 1000 spectrofluorometer. This embodiment of the scrambler has a thickness of 9.2 millimeters overall and a diameter of 16.0 millimeters between octagonal flats. Each prism has a base of 7.2 millimeters and an apex dimension of 2.0 millimeters. The angle $\theta$ of each prism is 18 degrees ±0.5 degrees and both prisms are formed of crystal quartz. The eight sides or facets of the wedges are each 6.63 millimeters wide, and the optical axis of the two prisms are aligned at 90 degrees ±0.1 degree to each other. The inner faces are ground and polished for contiguous optical contact. With these dimensions at a 768 nm operating wavelength more than 100 complete polarization cycles are realized.

Thus, an optical scrambler has been shown which provides an efficient means for compensating for undesired polarization in spectrophotometric apparatus.

While one embodiment of the invention has been shown and described, it will be obvious to those skilled in the art that changes and modifications may be made therein without departing from the invention in its broader aspects. Therefore, the aim of the appended claims is to cover all such changes and modifications as fall within the true spirit and scope of the invention.

I claim:

1. An optical scrambler for depolarizing generally parallel beams of polarized incident light including ultraviolet wavelengths comprising:
    a first wedge-shaped birefringent prism having a principal face perpendicular to said beams and an inclined face, and having an optic axis;
    a second wedge-shaped birefringent prism having a principal face perpendicular to said beams and an inclined face, and having an optic axis orthometrically disposed with respect to said optic axis of said first prism;
    said first and second prisms being juxtaposed with their base and apex portions oppositely oriented;
    means permanently joining said inclined faces in optically wrung relationship; and
    each of said first and second prisms having a respective apex angle defined by the angular displacement between said respective inclined face and said principal face, the respective apex angles of said first and second prisms being substantially equal and acute such that emergent beams of light from the principal face of said second prism are substantially parallel to said incident light beams on the principal face of said first prism, and said polarized incident light beams are transformed into a plurality of cycles of polarization at the principal face of said second prism containing all states of polarization.

2. An optical scrambler as defined in claim 1 wherein said optic axis of said first prism is arranged at 45 degrees to the polarization axis of said incident light beam.

3. An optical scrambler as defined in claim 2 wherein said first and second prisms have substantially identical dimensions.

4. An optical scrambler as defined in claim 3 wherein said first and second prisms are formed of anisotropic quartz.

5. An optical scrambler as defined in claim 1 wherein said apex angles of said first and second prisms are each approximately 18 degrees.

6. An optical scrambler for depolarizing generally parallel beams of incident light comprising:
    a pair of wedge-shaped birefringent prisms joined together, with their base and apex portions oppositely oriented, and their optic axes orthometrically disposed;
    said prisms providing a pair of parallel, planar light-incident and emergent faces for positioning perpendicular to the incident light;
    housing means enclosing the peripheral edge portions of said pair of prisms and defining generally opposite and aligned apertures on either side of said prism pair for permitting passage of light therethrough; and
    at least one pair of spaced alignment pins extending from said housing for mounting said prisms in a perpendicular relationship to the incident light beams.

* * * * *